United States Patent
Matsumura et al.

(10) Patent No.: US 12,167,412 B2
(45) Date of Patent: Dec. 10, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 257 days.

(21) Appl. No.: 17/635,583

(22) PCT Filed: Aug. 16, 2019

(86) PCT No.: PCT/JP2019/032195
§ 371 (c)(1),
(2) Date: Feb. 15, 2022

(87) PCT Pub. No.: WO2021/033224
PCT Pub. Date: Feb. 25, 2021

(65) Prior Publication Data
US 2022/0322411 A1 Oct. 6, 2022

(51) Int. Cl.
*H04W 72/12* (2023.01)
*H04L 5/00* (2006.01)
*H04W 72/23* (2023.01)
*H04W 74/08* (2024.01)
*H04W 74/0833* (2024.01)

(52) U.S. Cl.
CPC .......... *H04W 72/23* (2023.01); *H04L 5/0048* (2013.01); *H04W 74/0833* (2013.01)

(58) Field of Classification Search
CPC .. H04W 72/23; H04W 74/0833; H04L 5/0048
See application file for complete search history.

(56) References Cited

U.S. PATENT DOCUMENTS

| 11,601,945 B2* | 3/2023 | Bachu | H04L 5/0053 |
| 2019/0052329 A1 | 2/2019 | Aiba et al. | |
| 2019/0166615 A1* | 5/2019 | Nimbalker | H04W 72/21 |
| 2019/0246421 A1* | 8/2019 | Zhou | H04L 5/00 |
| 2019/0379509 A1* | 12/2019 | Stauffer | H04L 5/0048 |
| 2019/0394758 A1* | 12/2019 | Cheng | H04W 24/08 |

(Continued)

FOREIGN PATENT DOCUMENTS

| EP | 3986053 A1 | 4/2022 |
| JP | 2019-016826 A | 1/2019 |

(Continued)

OTHER PUBLICATIONS

Office Action in the counterpart Japanses Application No. 2021-541348, mailed Jul. 11, 2023 (6 pages).

(Continued)

*Primary Examiner* — Bailor C Hsu
(74) *Attorney, Agent, or Firm* — Osha Bergman Watanabe & Burton LLP

(57) ABSTRACT

A terminal according to an aspect of the present disclosure includes a transmitting section that transmits an uplink shared channel, and a control section that determines, when transmitting the uplink shared channel, existence of transmission of a phase tracking reference signal (PTRS) based on a type of a RNTI (Radio Network Temporary Identifier) used for downlink control information that schedules the uplink shared channel.

6 Claims, 13 Drawing Sheets

(56) References Cited

U.S. PATENT DOCUMENTS

| | | | |
|---|---|---|---|
| 2020/0008270 A1* | 1/2020 | Zhang | H04W 88/06 |
| 2020/0154410 A1 | 5/2020 | Suzuki et al. | |
| 2021/0045076 A1* | 2/2021 | Tomeba | H04W 56/001 |
| 2021/0100039 A1* | 4/2021 | Zhang | H04W 74/0833 |
| 2021/0250915 A1 | 8/2021 | Yoo et al. | |
| 2021/0368539 A1* | 11/2021 | Zewail | H04L 1/0003 |
| 2022/0232643 A1 | 7/2022 | Matsumura et al. | |
| 2022/0338276 A1* | 10/2022 | Taherzadeh Boroujeni | H04W 72/0446 |

FOREIGN PATENT DOCUMENTS

| | | |
|---|---|---|
| JP | 2019-091957 A | 6/2019 |
| WO | 2019103552 A1 | 5/2019 |

OTHER PUBLICATIONS

Nokia, Nokia Shanghai Bell: "Further comments on PT-RS", 3GPP TSG RAN WG1 Meeting #93, R1-1807197, Busan, Korea, May 21-25, 2018 (7 pages).

Nokia, Nokia Shanghai Bell: "On Enhanced UL Configured Grant Transmission for NR URLLC", 3GPP TSG RAN WG1 Meeting #97, R1-1906757, Reno, NV, USA, May 13-17, 2019 (8 pages).

Extended European Search Report issued in counterpart European Patent Application No. 19942084.5, mailed on Apr. 6, 2023 (11 pages).

3GPP TS 38.214 V15.6.0; "3rd Generation Partnership Project; Technical Specification Group Radio Access Network; NR; Physical layer procedures for data (Release 15)"; Jun. 2019 (105 pages).

Ericsson; "Summary of 7.1.6 Maintenance for URLLC"; 3GPP TSG RAN WG1 Meeting #94, R1-1809784; Göteborg, Sweden; Aug. 20-24, 2018 (37 pages).

International Search Report issued in PCT/JP2019/032195 on Mar. 17, 2020 (2 pages).

Written Opinion of the International Searching Authority issued in PCT/JP2019/032195 on Mar. 17, 2020 (3 pages).

Ericsson; "Feature lead summary 1 of PT-RS"; 3GPP TSG RAN WG1 Meeting #93, R1-1807658; Busan, Korea; May 21-25, 2018 (20 pages).

Ericsson; "Feature lead summary of PT-RS"; 3GPP TSG RAN WG1 Meeting #94bis, R1-1811848; Chengdu, China; Oct. 8-12, 2018 (10 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Indian Application No. 202217006960, mailed Feb. 13, 2024 (5 pages).

* cited by examiner

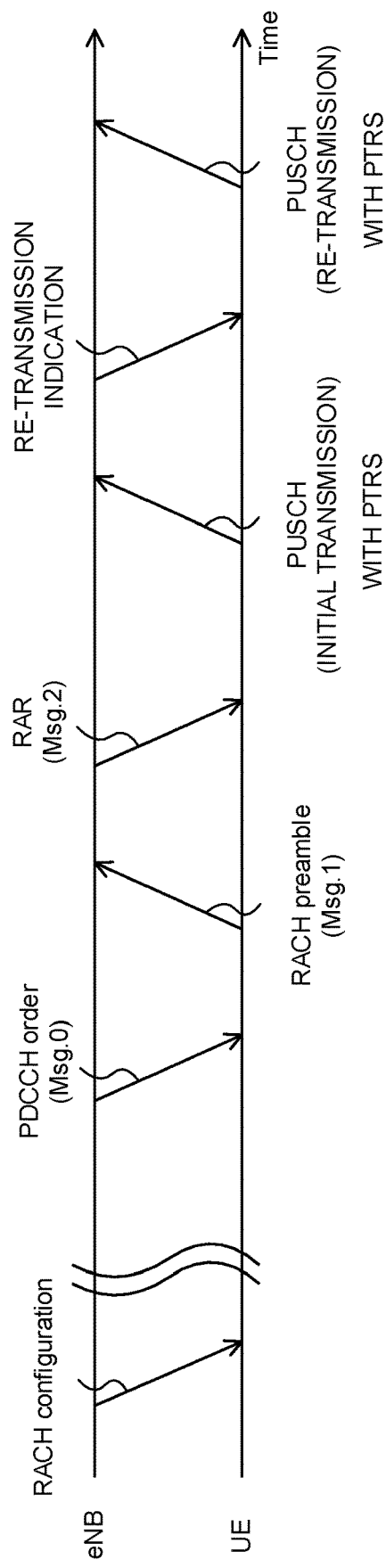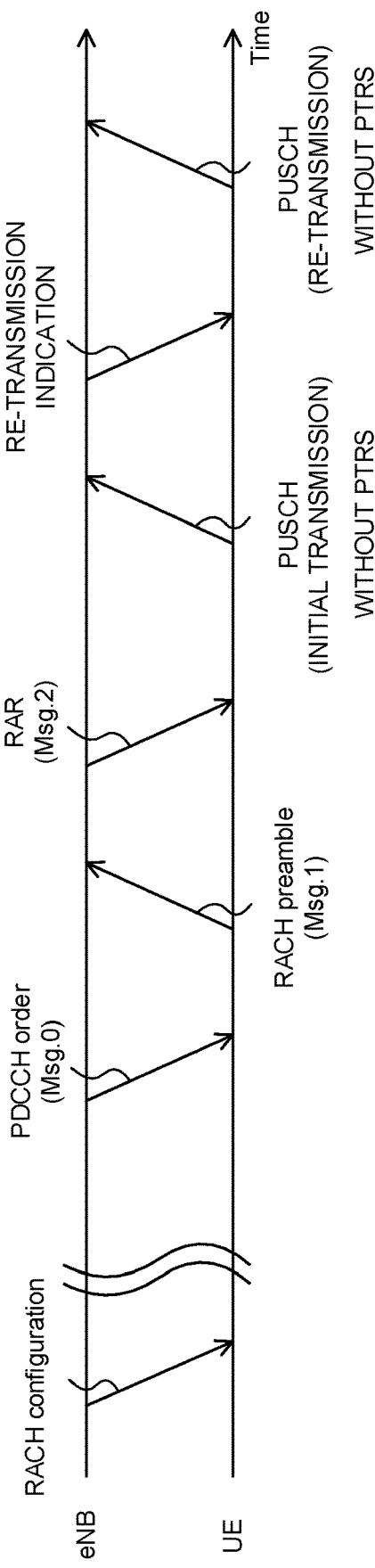

| MCS Index $I_{MCS}$ | Modulation Order $Q_m$ | Target code Rate R x 1024 | Spectral efficiency |
|---|---|---|---|
| 0 | q | 240/ q | 0.2344 |
| 1 | q | 314/ q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

FIG. 7

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In an existing LTE system (for example, 3GPP Rel. 8 to Rel. 14), a user terminal (UE: User Equipment) controls reception of a downlink shared channel (for example, PDSCH: Physical Downlink Shared Channel) based on downlink control information (DCI; also referred to as DL assignment or the like) from a base station. The user terminal controls transmission of an uplink shared channel (for example, PUSCH: Physical Uplink Shared Channel) based on the DCI (also referred to as UL grant or the like).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Discusses have been made on UL and DL transmission of a phase tracking reference signal (PTRS) in a radio communication system (for example, NR) in the future. For example, when transmitting an uplink shared channel (for example, PUSCH), a UE controls transmission of a PTRS based on configurations from a network (for example, base station).

In NR, a random access procedure is supported. In the random access procedure, when a UL transmission indication (for example, UL grant) is included in a response signal transmitted in response to a random access preamble, a UE performs PUSCH transmission based on the UL grant. However, discussions have not sufficiently been made how to control PTRS transmission in such a case.

Thus, it is an object of the present disclosure to provide a terminal and a radio communication method that can appropriately transmit a phase tracking reference signal (PTRS).

Solution to Problem

A terminal according to an aspect of the present disclosure includes: a transmitting section configured to transmit an uplink shared channel; and a control section configured to determine, when transmitting the uplink shared channel, existence of transmission of a phase tracking reference signal (PTRS) based on a type of a RNTI (Radio Network Temporary Identifier) used for downlink control information that schedules the uplink shared channel.

Advantageous Effects of Invention

According to an aspect of the present disclosure, it is possible to appropriately transmit a phase tracking reference signal (PTRS).

BRIEF DESCRIPTION OF DRAWINGS

FIGS. 5A and 5B are diagrams to show an example of PUSCH transmission control according to a second aspect;

FIG. 7 is a diagram to show an example of an MCS table;

DESCRIPTION OF EMBODIMENTS

<Random Access Procedure>

In an existing LTE system (for example, LTE Rel. 8 to Rel. 13), a random access procedure for establishing UL synchronization is supported. The random access procedure includes a contention-based random access (also referred to as CBRA or the like) and a contention-free random access (also referred to as Non-CBRA, CFRA or the like).

In the contention-based random access (CBRA), a terminal (hereinafter also referred to as user terminal or UE) transmits a preamble randomly selected from among a plurality of preambles (also referred to as random access preamble, random access channel (Physical Random Access Channel (PRACH)), RACH preamble, or the like) determined for each cell. The contention-based random access is a UE-initiated random access procedure and can be used, for example, at initial access, start or restart of UL transmission, or the like.

In the contention-free random access (Non-CBRA, CFRA), a base station uniquely allocates a preamble to a UE through a downlink (DL) control channel (PDCCH), and the UE transmits the preamble allocated by the base station. The contention-free random access is a network-initiated random access procedure and can be used, for example, at handover, start or restart of DL transmission (start or restart of UL transmission of DL re-transmission indication information), or the like.

Figure 1:
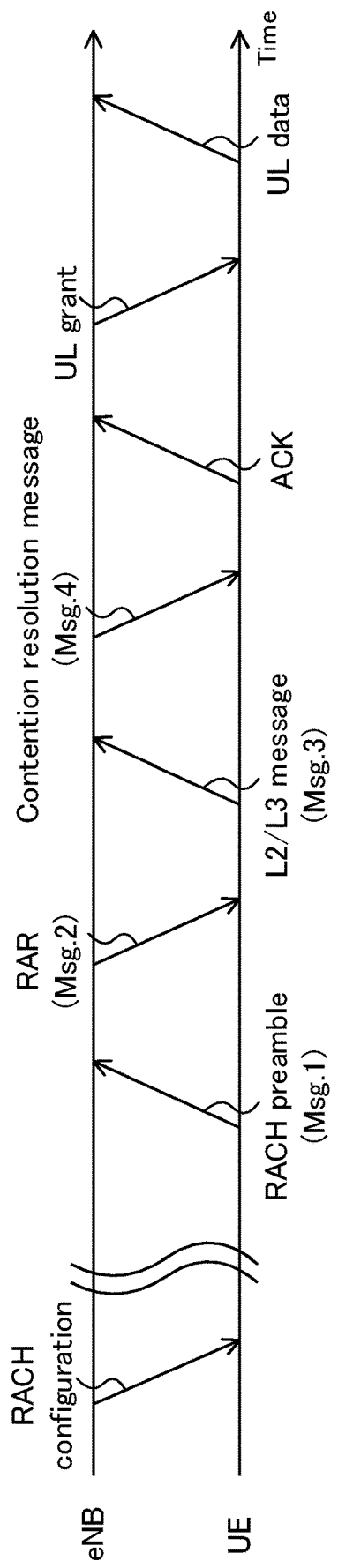
FIG. 1 is a diagram to show an example of a contention-based random access procedure.

FIG. 1 is a diagram to show an example of the contention-based random access. In FIG. 1, a UE receives, in advance, information (PRACH configuration information) indicating a random access channel (PRACH) configuration (PRACH configuration, RACH configuration) through system information (for example, MIB (Mater Information Block) and/or SIB (System Information Block)) or higher layer signaling (for example, RRC (Radio Resource Control) signaling).

The PRACH configuration information may indicate, for example, a plurality of preambles (for example, preamble formats) determined for each cell, a time resource (for example, system frame number or subframe number) and a frequency resource (for example, offset (prach-Frequency-Offset) indicating the start position of six resource blocks (PRBs: Physical Resource Blocks)) used for PRACH transmission.

As shown in FIG. 1, in a case in which the UE transitions from an idle (RRC_IDLE) state to an RRC connection (RRC_CONNECTED) state (for example, at initial access), a case where UL synchronization is not established even in the RRC connected state (for example, start or restart of UL transmission), or the like, the UE randomly selects one of the plurality of preambles indicated by the PRACH configuration information and transmits the selected preamble through a PRACH (Message 1).

When having detected the preamble, a base station transmits a random access response (RAR) in response to the preamble (Message 2). When having failed in RAR reception in a certain duration (RAR window) after transmission of the preamble, the UE transmits (re-transmits) the preamble again with increased PRACH transmission power. Note that transmission power increase at re-transmission is also called power ramping.

When having received the RAR, the UE establishes UL synchronization by adjusting a UL transmission timing based on timing advance (TA) included in the RAR. In addition, the UE transmits a higher-layer (L2/L3: Layer 2/Layer 3) control message with a UL resource specified by a UL grant included in the RAR (Message 3). The control message includes a UE identifier (UE-ID). The UE identifier may be, for example, a higher-layer UE-ID such as a C-RNTI (Cell-Radio Network Temporary Identifier) in a case of the RRC connected state or an S-TMSI (System Architecture Evolution-Temporary Mobile Subscriber Identity) in a case of the idle state.

The base station transmits a contention-resolution message in accordance with the higher-layer control message (Message 4). The contention-resolution message is transmitted based on the UE identifier destination included in the above-described control message. When having successfully detected the contention-resolution message, the UE transmits acknowledge (ACK) in a HARQ (Hybrid Automatic Repeat reQuest) to the base station. Accordingly, the UE in the idle state transitions to the RRC connected state.

When having failed in detection of the contention-resolution message, the UE determines that contention has occurred, reselects a preamble, and repeats the random access procedure of Messages 1 to 4. When having detected contention-resolution through ACK from the UE, the base station transmits a UL grant to the UE. The UE starts UL data by using a UL resource allocated by the UL grant.

Figure 2:
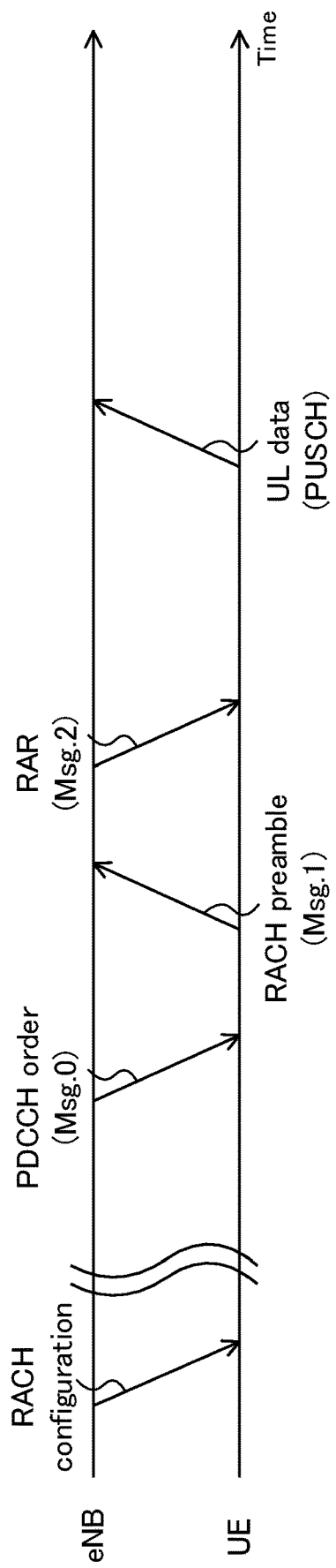
FIG. 2 is a diagram to show an example of a contention-free random access procedure.

FIG. 2 is a diagram to show an example of the contention-free random access. In a case of the contention-free random access, a base station first transmits, to a UE, a physical downlink control channel (PDCCH-order) that indicates PRACH transmission (Message 0). The UE transmits a random access preamble (PRACH) at a timing indicated by the PDCCH (Message 1). When having detected the random access preamble, the base station transmits a random access response (RAR) that is response information in response to the random access preamble (Message 2).

The UE completes contention-free random access processing by reception of Message 2. When having failed in reception of Message 2, as in the contention-based random access, the UE transmits Message 1 again with increased PRACH transmission power. When having received Message 2, the UE may transmit UL data (for example, PUSCH) based on a UL transmission indication (UL grant) included in Message 2.

Figure 3:
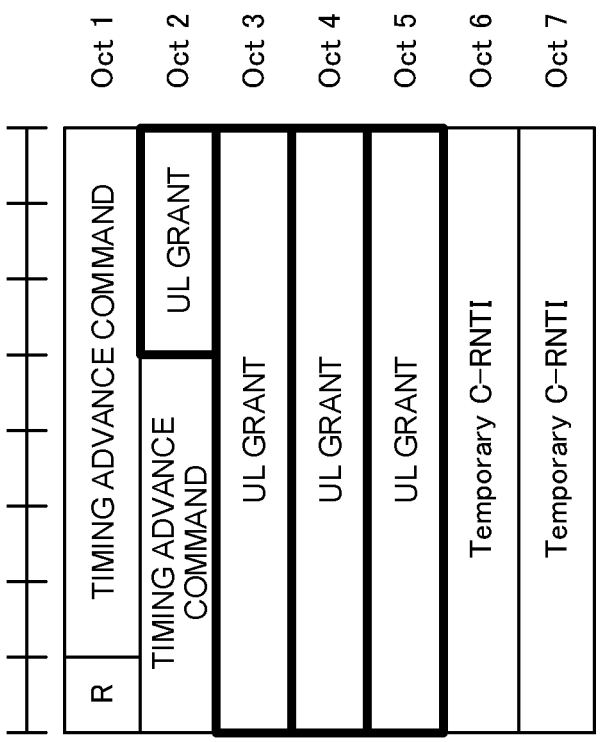
FIG. 3 is a diagram to show an example of an RAR notified by a MAC CE.

In each of the contention-based random access procedure and the contention-free random access procedure, information (for example, UL grant) that instructs UL transmission may be included in the random access response (RAR) (refer to FIG. 3). FIG. 3 shows an example of MAC control information (MAC RAR) corresponding to the RAR. The UE performs uplink shared channel (PUSCH) transmission based on a timing advance command, a UL grant, or the like included in the RAR.

In the contention-based random access procedure, the UE transmits a PUSCH corresponding to Message 3 based on the UL grant included in the RAR. In the contention-free random access procedure, the UE transmits a PUSCH based on the UL grant included in the RAR. The PUSCH may include, for example, a power headroom or buffer status report.

<PTRS>

In NR, a base station (for example, gNB) transmits a phase tracking reference signal (PTRS) in a downlink. For example, the base station may continuously or non-continuously maps the PTRS in the time direction through one subcarrier. The base station may transmit the PTRS in at least part of the duration (such as slot or symbol) in which a downlink shared channel (PDSCH) is transmitted. The PTRS transmitted by the base station may be called DL PTRS.

A UE transmits a phase tracking reference signal (PTRS) in an uplink. For example, the UE may continuously or non-continuously map the PTRS in the time direction through one subcarrier. The UE may transmit the PTRS in at least part of the duration (such as slot or symbol) in which an uplink shared channel (PUSCH: Physical Uplink Shared Channel) is transmitted. The PTRS transmitted by the UE may be called UL PTRS. Hereinafter, the UL PTRS is simply referred to as PTRS.

The UE may determine whether a PTRS exists in an uplink (for example, existence of transmission of a PTRS) based on configuration of higher layer signaling (for example, PTRS-UplinkConfig). The UE may assume that a PTRS exists in a resource block used for PUSCH transmission when PTRS-related higher layer signaling (for example, PTRS-UplinkConfig) is configured. The base station may determine phase noise based on a PTRS transmitted from the UE and correct phase error of a received signal.

Here, for example, the higher layer signaling may be any one or combinations of RRC (Radio Resource Control)

signaling, MAC (Medium Access Control) signaling, broadcast information, and the like.

For example, the MAC signaling may use MAC control elements (MAC CE), MAC PDUs (Protocol Data Units), and the like. The broadcast information may be, for example, a master information block (MIB), a system information block (SIB), minimum system information (Remaining Minimum System Information (RMSI)), other system information (OSI), or the like.

In a case of transmitting a PUSCH as well as a PTRS, the UE may execute control (for example, rate matching) not to apply, to the PUSCH transmission, a resource to which the PTRS is mapped.

In an existing system (for example, the current Rel. 15), discussions have been made on PTRS transmission control based on the type or kind of an applied RNTI (Radio Network Temporary Identifier) even when PTRS-related higher layer signaling (for example, PTRS-UplinkConfig) is configured. For example, it has been discussed that PTRS existence in a PUSCH is allowed or supported in a case in which the RNTI is an MCS-C-RNTI, a C-RNTI, a CS-RNTI, or an SP-CSI-RNTI.

The RNTI is applied to a plurality of signal or channels (for example, PDSCHs, PUSCHs, or PDCCHs), but in current definition, it is not clearly defined to which signal or channel the RNTI is applied.

For example, a PUSCH scheduled by a UL grant (RAR UL grant) included in a response signal (RAR) corresponding to a random access preamble is scrambled with a TC-RNTI in a case of the CBRA or scrambled with a C-RNTI in a case of the CFRA. Alternatively, when an uplink shared channel is scheduled by a downlink control channel (or DCI), an RNTI applied to the downlink control channel is differently configured.

In this manner, when a signal or channel corresponding to an RNTI that determines the existence of transmission of a PTRS is not clear, PTRS transmission potentially cannot be appropriately performed. For example, a case is conceivable in which an RNTI applied to a PDCCH that schedules a PUSCH can be different from an RNTI applied to the PUSCH, and in such a case, it is problematic how to control PTRS transmission.

Thus, as an aspect of the present invention, the inventors of the present invention focused on unclear correspondence between a signal or a channel and an RNTI that controls the existence of transmission of a PTRS, and came up with the idea of appropriate determination of the existence of transmission of a PTRS by clarifying the signal or channel corresponding to the RNTI. Alternatively, the inventors of the present invention came up with the idea of clear definition of the existence of transmission of a PTRS in a PUSCH scheduled by an RAR UL grant.

Consider a case in which a signal or channel corresponding to an RNTI is downlink control information (or DCI). In this case, a UL grant (RAR UL grant) included in an RAR is transmitted and notified by MAC and thus is not CRC-scrambled by a specific (given) RNTI (for example, MCS-C-RNTI, C-RNTI, CS-RNTI, or SP-CSI-RNTI). Thus, no PTRS is basically included (exists) in a PUSCH scheduled by the RAR UL grant.

When the base station has failed in processing of receiving (for example, decoding) the PUSCH scheduled by the RAR UL grant, the base station triggers or indicates PUSCH re-transmission. For example, in the contention-free random access, the re-transmission can be scheduled by using DCI CRC-scrambled by a C-RNTI.

In this case, when a PTRS is configured by higher layer signaling (for example, PTRS-UplinkConfig), it is assumed that the PTRS exists in the PUSCH re-transmission (for example, the UE transmits a PTRS when transmitting a PUSCH). When no PTRS exists in PUSCH initial transmission, the size of a transport block potentially cannot be held same between a PUSCH of initial transmission and a PUSCH of re-transmission.

As another aspect of the present invention, the inventors of the present invention discussed PTRS transmission (or mapping) control in at least one of initial transmission of a PUSCH transmitted based on an RAR UL grant and re-transmission of the PUSCH, and reached an embodiment of the present invention.

Embodiments according to the present disclosure will be described in detail with reference to the drawings as follows. Note that first to fifth aspects described below may be each applied alone or may be applied in combination of at least two. In the following description, the existence of transmission of a PTRS and the existence of a PTRS may be interchangeably interpreted.

The following description is made on, as an example, the existence of transmission of a PTRS in PUSCH transmission indicated by an RAR UL grant in the contention-free (CFRA) random access procedure, but the present invention is not limited thereto. The present invention may be applied to a PTRS in PUSCH transmission indicated by an RAR UL grant in the contention-based (CBRA) random access procedure. Alternatively, the present invention may be applied to a PTRS in initial transmission and re-transmission of a PUSCH (for example, configured-grant-based PUSCH) other than that in a random access procedure.

Note that, in the present specification, re-transmission may mean the first transmission as re-transmission (or retransmission) after initial transmission or may mean a plurality of re-transmissions (multiple times of re-transmissions after the first re-transmission).

(First Aspect)

In a first aspect, description will be made on a case in which an RNTI that determines the existence of transmission of a PTRS is an RNTI applied to a specific signal or channel (or RNTI used to scramble a specific signal or channel). The following description will be made on a case (Case 1) in which the specific signal or channel is a downlink shared channel (or DCI) and a case (Case 2) in which the specific signal or channel is an uplink shared channel.

In the following description, an RNTI applied to a PDCCH may be an RNTI applied to CRC scrambling of the PDCCH. An RNTI applied to a PUSCH may be an RNTI applied to scrambling of the PUSCH. An RNTI applied to a PUSCH may be used for mapping of an RS such as a PTRS and generation of a sequence.

<Case 1>

In transmission of a PUSCH scheduled by a PDCCH (or DCI) CRC-scrambled by a specific (given) RNTI, a PTRS may be transmitted (or mapped). The specific RNTI may be, for example, an MCS-C-RNTI, a C-RNTI, a CS-RNTI, or an SP-CSI-RNTI.

Figure 4A:
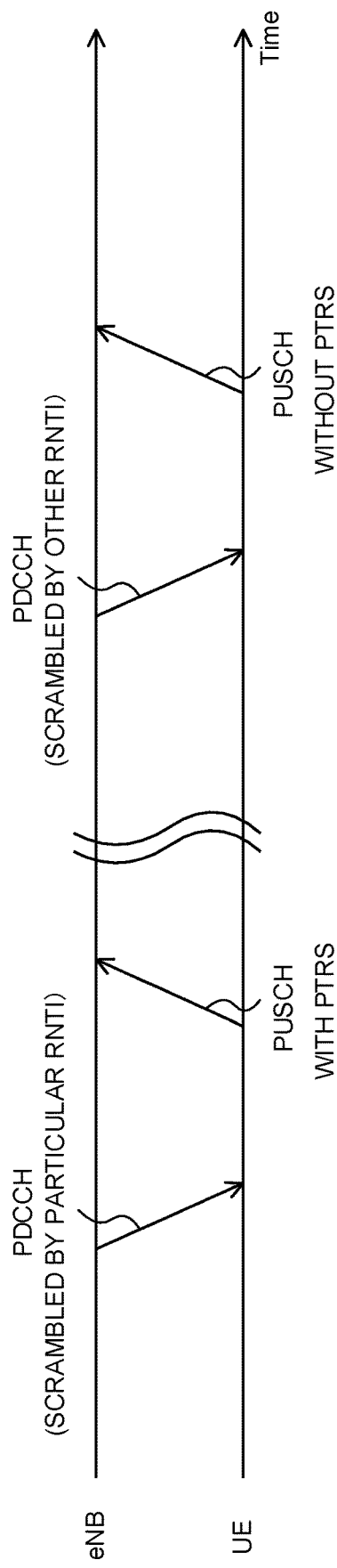
FIGS. 4A and 4B are diagrams to show an example of PUSCH transmission control according to a first aspect.

For example, when a PDCCH that schedules a PUSCH (or DCI) is CRC-scrambled by a specific RNTI, the UE may control transmission processing (for example, mapping) by assuming that a PTRS exists in a resource block used for PUSCH transmission (refer to FIG. 4A). The DCI may be in a DCI format (for example, at least one of DCI formats 0_0 and 0_1) corresponding to a UL grant.

When a PDCCH (or DCI) that schedules a PUSCH is CRC-scrambled by a PDCCH other than a specific RNTI, the UE may control transmission processing (for example, mapping) by assuming that no PTRS exists in a resource block used for PUSCH transmission.

For example, when an RNTI used for PUSCH scrambling is a specific RNTI but a DL signal or channel (for example, PDCCH) that indicates (for example, schedules) transmission of the PUSCH is not scrambled by a specific RNTI, the UE may execute control not to transmit a PTRS. In other words, the UE may execute control not to transmit a PTRS irrespective of the type of an RNTI applied to scrambling of a PUSCH scheduled by an RAR UL grant.

In this manner, it is possible to appropriately control the existence of transmission of a PTRS along with a PUSCH by clearly defining a signal or channel corresponding to an RNTI that determines the existence of transmission of a PTRS, thereby simplifying UE operation.

[Variation]

Figure 4B:
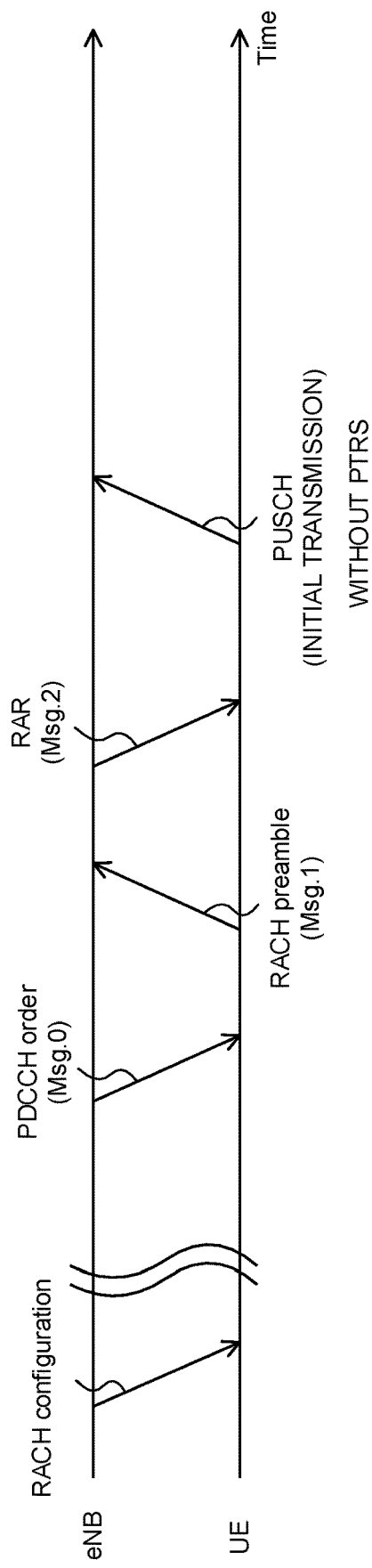

Alternatively, it may be configured such that no PTRS exists in a PUSCH scheduled by an RAR UL grant without clear definition of a signal or channel corresponding to an RNTI (refer to FIG. 4B). Accordingly, the UE can execute control not to transmit a PTRS irrespective of an RNTI used for the PUSCH (for example, initial transmission) scheduled by the RAR UL grant. As a result, UE operation can be simplified.

<Case 2>

It may be configured such that a PTRS is transmitted (mapped) in transmission of a PUSCH scrambled by a specific RNTI. The specific RNTI may be, for example, an MCS-C-RNTI, a C-RNTI, a CS-RNTI, or an SP-CSI-RNTI.

For example, when a PUSCH is CRC-scrambled by a specific RNTI, the UE may control transmission processing (for example, mapping) by assuming that a PTRS exists in a resource block used for PUSCH transmission.

In this case, the UE can transmit a PTRS when transmitting a PUSCH not scheduled by a PDCCH. For example, a configured-grant-based PUSCH is scrambled by a CS-RNTI but not scheduled by a PDCCH. When Case 2 is applied, it is possible to transmit a PTRS when transmitting a configured-grant-based PUSCH (for example, PUSCH scrambled by a CS-RNTI) not scheduled by a PDCCH. Type 1 and Type 2 are defined for the configured-grant-based PUSCH, the present aspect may be applied to one of the types or both types.

When Case 2 is applied, a PUSCH scheduled by an RAR UL grant is scheduled by a C-RNTI in the contention-free random access (CFRA), and thus PTRS existence in PUSCH transmission may be allowed or supported. However, in the contention-based random access (CBRA), a PUSCH scheduled by an RAR UL grant is scheduled by a TC-RNTI, and thus it may be configured such that PTRS existence in PUSCH transmission is not allowed nor supported.

[Variation]

Alternatively, in Case 2, it may be configured such that no PTRS exists in a PUSCH scheduled by an RAR UL grant. In other words, for a PUSCH scheduled by an RAR UL grant, it may be controlled not to transmit a PTRS irrespective of the type of an applied RNTI.

Accordingly, in both the contention-free random access (CFRA) and the contention-based random access (CBRA), it may be configured such that PTRS existence is not allowed nor supported in PUSCH transmission scheduled by an RAR UL grant. As a result, operation of the UE and the base station can be commonalized irrespective of the type of random access.

(Second Aspect)

In a second aspect, when an uplink shared channel (for example, PUSCH) is transmitted based on a random access response (for example, RAR), the existence of a PTRS in the PUSCH is controlled to be in common between initial transmission and re-transmission of the PUSCH.

Specifically, when performing PTRS transmission (or mapping) in a PUSCH of initial transmission, the UE performs PTRS transmission in a PUSCH of re-transmission as well (refer to FIG. 5A). However, when not performing PTRS transmission (or mapping) in a PUSCH of initial transmission, the UE may control not to perform PTRS transmission in a PUSCH of re-transmission (refer to FIG. 5B).

For example, the UE may control PTRS transmission in a PUSCH by using at least one of Options 1-1 to 1-3 described below.

<Option 1-1>

The UE executes control not to perform PTRS transmission (or mapping) in PUSCH initial transmission and not to perform PTRS transmission in PUSCH re-transmission (refer to FIG. 5A). When PTRS configuration is made by higher layer signaling, the UE may ignore the configuration by higher layer signaling and execute control not to perform PTRS transmission.

When PTRS transmission is performed in each of PUSCH initial transmission and re-transmission, the transport block size (TBS) can be easily controlled to be same between the initial transmission and the re-transmission.

<Option 1-2>

The UE executes control to perform PTRS transmission (or mapping) in PUSCH initial transmission and perform PTRS transmission in PUSCH re-transmission (refer to FIG. 5A).

Option 1-2 may be applied to a case in which PTRS configuration is made by higher layer signaling (for example, UE-specific parameter). It may be configured such that Option 1-1 is applied when PTRS configuration is not made by higher layer signaling.

Alternatively, Option 1-2 may be applied to a case in which PTRS configuration is not made by higher layer signaling. In this case, the UE may perform PTRS transmission irrespective of the configuration by higher layer signaling.

Alternatively, a PTRS corresponding to initial transmission and a PTRS corresponding to re-transmission may be each configured by separate higher layer signaling. In this case, when a PTRS corresponding to initial transmission is configured, Option 1-2 may be applied irrespective of whether a PTRS corresponding to re-transmission is configured (for example, even when no PTRS is configured).

The transport block size can be easily controlled to be same between initial transmission and re-transmission by transmitting a PTRS in each of PUSCH initial transmission and re-transmission. In each of initial transmission and re-transmission, the base station can determine phase noise based on a PTRS transmitted from the UE and appropriately correct phase error of a received signal.

<Option 1-3>

The UE may execute control to perform PTRS transmission (or mapping) in PUSCH initial transmission and re-transmission irrespective of whether PTRS configuration is made by higher layer signaling (UE-specific parameter).

In such a case, the UE may perform PTRS transmission by applying a certain value (for example, default value) as a PTRS configuration parameter. The PTRS configuration parameter may be at least one of a time density (time Density) and a frequency density (frequency Density).

For example, when no higher layer parameter (timeDensity) related to a time density is notified or when no field of timeDensity exists, the UE may apply a certain time density (for example, L_PT-RS=1). Alternatively, when no higher layer parameter (frequencyDensity) related to a frequency density is notified or when no field of frequencyDensity exists, the UE may apply a certain frequency density (for example, K_PT-RS=2).

The UE may apply a certain PTRS configuration parameter only when PTRS configuration is not made by higher layer signaling, or may apply a certain PTRS configuration parameter even when PTRS configuration is made by higher layer signaling.

In this manner, it is possible to appropriately control PTRS transmission in a PUSCH scheduled by an RAR UL grant by controlling PTRS transmission in PUSCH initial transmission and re-transmission irrespective of PTRS configuration by a higher layer parameter.

<Variation>

The UE may determine whether to include a PTRS in re-transmission based on whether a PTRS is included in initial transmission (or the previous re-transmission) irrespective of PTRS configuration by higher layer signaling and the type of an RNTI.

(Third Aspect)

In a third aspect, in a case of transmission of an uplink shared channel based on a random access response, the existence of a PTRS in the PUSCH is separately (for example, differently) controlled for PUSCH initial transmission and PUSCH re-transmission.

Specifically, the UE independently controls PTRS transmission (or mapping) in PUSCH transmission as initial transmission, and PTRS transmission in PUSCH transmission as re-transmission.

For example, the UE may control PTRS transmission in a PUSCH by using at least one of Options 2-1 to 2-4 described below.

<Option 2-1>

The UE executes control not to perform PTRS transmission (or mapping) in PUSCH initial transmission. The UE may execute control not to perform PTRS transmission irrespective of PTRS configuration by higher layer signaling.

Figure 6A:
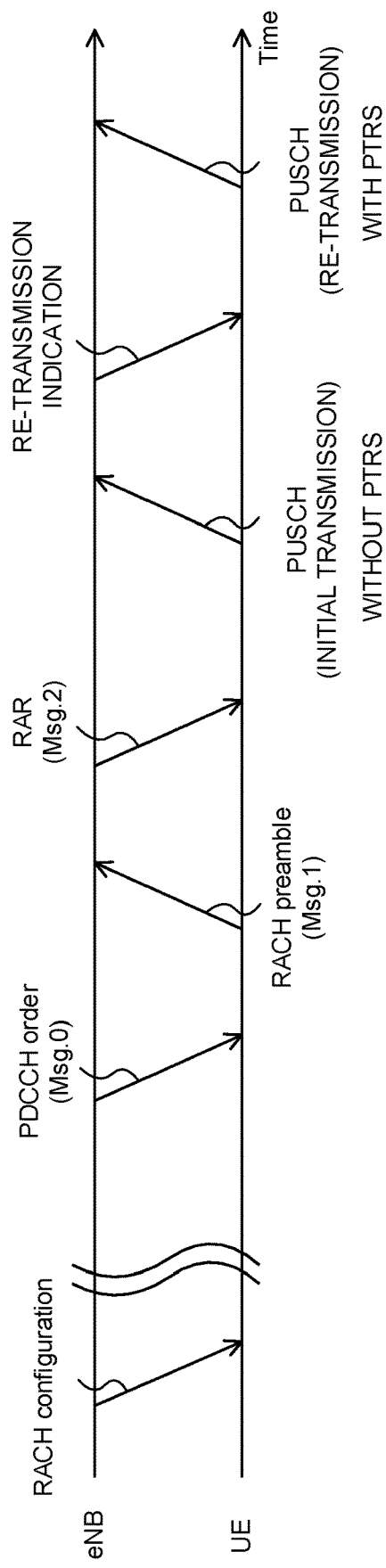
FIGS. 6A and 6B are diagrams to show another example of PUSCH transmission control according to a third aspect.

The UE may control existence of transmission of a PTRS, based on existence of PTRS configuration by higher layer signaling in PUSCH re-transmission. For example, when PTRS configuration is made by higher layer signaling, the UE executes control to perform PTRS transmission in PUSCH re-transmission (refer to FIG. 6A).

Alternatively, the UE may execute control to perform PTRS transmission in PUSCH re-transmission even when no PTRS configuration is made by higher layer signaling. In this case, the UE may perform PTRS transmission irrespective of the non-PTRS configuration by higher layer signaling.

In this manner, when PTRS transmission is not performed in PUSCH initial transmission but is performed in PUSCH re-transmission, it is possible to appropriately perform phase noise correction by using a PTRS in a re-transmitted PUSCH. Accordingly, reduction in the error rate of the re-transmitted PUSCH can be expected.

<Option 2-2>

The UE may control existence of transmission of a PTRS based on existence of PTRS configuration by higher layer signaling in PUSCH initial transmission. For example, when PTRS configuration is made by higher layer signaling, the UE executes control to perform PTRS transmission in PUSCH re-transmission.

Figure 6B:
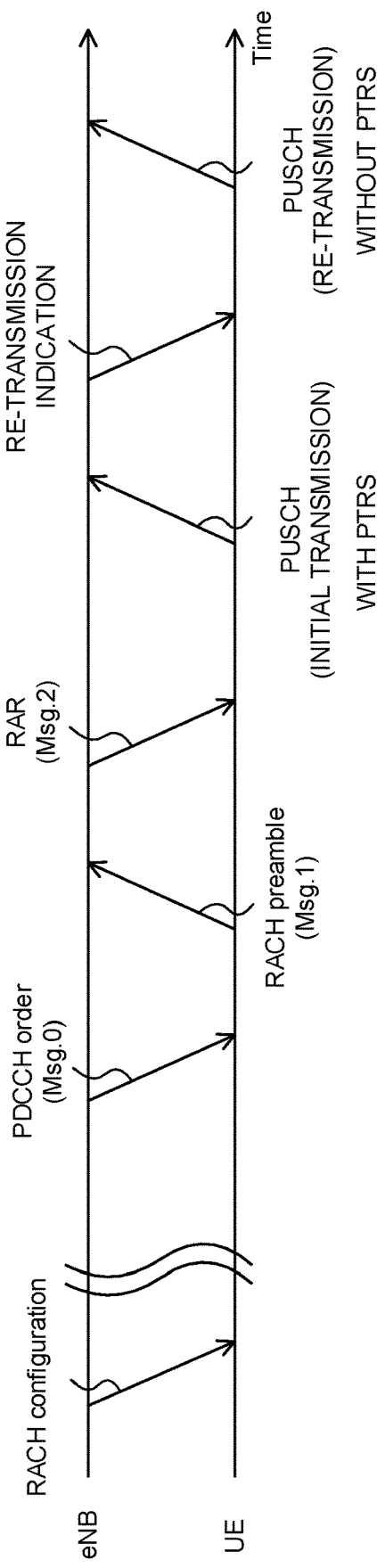

The UE may execute control not to perform PTRS transmission irrespective of PTRS configuration by higher layer signaling in PUSCH re-transmission (refer to FIG. 6B). For example, when PTRS configuration is made by higher layer signaling, the UE may execute control not to perform PTRS transmission irrespective of the configuration by higher layer signaling.

In this manner, when PTRS transmission is performed in PUSCH initial transmission but not performed in PUSCH re-transmission, it is possible to reduce the error rate of a re-transmitted PUSCH in re-transmission at a lower coding rate of data than that of initial transmission. Moreover, it is possible to reduce the amount of resources used by a re-transmitted PUSCH in re-transmission at the same coding rate of data as that of initial transmission, compared to the initial transmission, and thus improvement of the frequency use efficiency of the re-transmitted PUSCH can be expected.

<Option 2-3>

The UE may separately control existence of transmission of a PTRS in PUSCH initial transmission and existence of transmission of a PTRS in PUSCH re-transmission, irrespective of PTRS configuration by higher layer signaling (UE-specific parameter).

For example, the UE may execute control to transmit a PTRS in PUSCH initial transmission but not to transmit a PTRS in PUSCH re-transmission irrespective of PTRS configuration by higher layer signaling (UE-specific parameter).

A PTRS configuration parameter applied to PTRS transmission in PUSCH initial transmission may be a certain value (for example, default value). The PTRS configuration parameter applied to PTRS transmission may be provided by the method described above in Option 1-3.

<Option 2-4>

The UE may separately control existence of transmission of a PTRS in PUSCH initial transmission and existence of transmission of a PTRS in PUSCH re-transmission, irrespective of PTRS configuration by higher layer signaling (UE-specific parameter).

For example, the UE may execute control not to transmit a PTRS in PUSCH initial transmission but to transmit a PTRS in PUSCH re-transmission, irrespective of PTRS configuration by higher layer signaling (UE-specific parameter).

A PTRS configuration parameter applied to PTRS transmission in PUSCH re-transmission may be a certain value (for example, default value). The PTRS configuration parameter applied to PTRS transmission may be provided by the method described above in Option 1-3.

In this manner, when existence of transmission of a PTRS in each of PUSCH initial transmission and re-transmission is separately controlled irrespective of PTRS configuration by a higher layer parameter, the effects of phase noise correction and error rate reduction due to PTRS insertion and the effect of data coding rate reduction or PUSCH-used resource reduction due to no PTRS insertion can be appropriately controlled in each of initial transmission and re-transmission. As a result, it is possible to more flexibly and appropriately control improvement of the use efficiency and communication quality of a network.

(Fourth Aspect)

In a fourth aspect, in a case of transmission of an uplink shared channel based on a random access response, the UE autonomously determines the existence of a PTRS in at least one of PUSCH initial transmission and PUSCH re-transmission (UE implementation).

For example, the UE may control PTRS transmission in a PUSCH by using at least one of Options 3-1 to 3-5 described below.

<Option 3-1>

The UE executes control not to perform PTRS transmission (or mapping) in PUSCH initial transmission. The UE may execute control not to perform PTRS transmission irrespective of PTRS configuration by higher layer signaling.

However, the UE may autonomously determine the existence of transmission of a PTRS in PUSCH re-transmission.

<Option 3-2>

The UE may control existence of transmission of a PTRS based on existence of PTRS configuration by higher layer signaling in PUSCH initial transmission. For example, when PTRS configuration is made by higher layer signaling, the UE executes control to perform PTRS transmission in PUSCH initial transmission.

However, the UE may autonomously determine the existence of transmission of a PTRS in PUSCH re-transmission (UE implementation).

<Option 3-3>

The UE may autonomously determine the existence of transmission of a PTRS in PUSCH initial transmission.

However, the UE executes control not to perform PTRS transmission (or mapping) in PUSCH re-transmission. The UE may execute control not to perform PTRS transmission irrespective of PTRS configuration by higher layer signaling.

<Option 3-4>

The UE may autonomously determine the existence of transmission of a PTRS in PUSCH initial transmission.

The UE may control existence of transmission of a PTRS, based on existence of PTRS configuration by higher layer signaling in PUSCH re-transmission. For example, when PTRS configuration is made by higher layer signaling, the UE executes control to perform PTRS transmission in PUSCH re-transmission.

<Option 3-5>

The UE may autonomously determine the existence of transmission of a PTRS in each of PUSCH initial transmission and PUSCH re-transmission.

In this manner, the UE autonomously determines the existence of transmission of a PTRS, thereby appropriately performing PUSCH transmission based on an RAR UL grant even when PTRS configuration is not indicated from the base station.

(Fifth Aspect)

In a fifth aspect, the transport block size (TBS) applied in PUSCH initial transmission and re-transmission will be described below. The fifth aspect is preferably applicable to a case (for example, the third aspect) in which PTRS transmission is applied to only one of initial transmission and re-transmission. A configuration to which the fifth aspect is applicable is not limited to the case.

In NR, based on a certain field (for example, modulation and coding scheme (MCS) field) included in downlink control information (for example, UL grant), at least one of the modulation scheme (or modulation order) and coding rate of a PUSCH scheduled by the DCI is controlled.

Specifically, it has been discussed that the UE determines, for a PUSCH, a modulation order and/or coding rate corresponding to an MCS index indicated by the MCS field in the DCI by using a table (MCS table) that associates an MCS index, a modulation order, and a TBS index.

Each modulation order is a value corresponding to a modulation scheme. For example, the modulation orders of QPSK (Quadrature Phase Shift Keying), 16 QAM (Quadrature Amplitude Modulation), 64 QAM, and 256 QAM are "2", "4", "6", and "8", respectively.

FIG. 7 is a diagram to show an example of the MCS table. Note that values in the MCS table shown in FIG. 7 are merely exemplary, and the present invention is not limited thereto. Some of elements (for example, spectrum efficiency) associated with the MCS index ($I_{MCS}$) may be omitted, and any other element may be added.

FIG. 7 shows an exemplary table applied when transform precoding is activated and the above-described MCS table information does not indicate 256 QAM. Note that a table applied when transform precoding is deactivated and a table applied when transform precoding is activated and MCS table information indicates 256 QAM may be separately defined.

The UE may determine a modulation order and/or coding rate corresponding to the MCS index ($I_{MCS}$) in the DCI by using the table in FIG. 7. For example, in FIG. 7, when the UE satisfies a particular condition (for example, BPSK support), a modulation order q corresponding to a particular MCS index (for example, "0" or "1") may be "1" (BPSK). When the above-described particular condition is not satisfied, the modulation order q may be "2" (QPSK).

In this manner, the UE determines a modulation scheme to be applied to a PUSCH (initial transmission or re-transmission) based on an MCS index included in a UL grant.

In the table in FIG. 7, the MCS indices 28 to 31 correspond to reserved bits. In the fifth aspect, a transport block size (TBS) applied to a PUSCH is notified by using the reserved bits.

For example, when the MCS field included in DCI (for example, UL grant) that indicates PUSCH re-transmission indicates a certain MCS index, the UE applies, in PUSCH re-transmission, the TBS applied in initial transmission (or the previous re-transmission). In other words, when any of the MCS indices 28 to 31 is specified by the MCS field, the UE executes control so that the TBS is same between initial transmission and re-transmission.

In this example, it is assumed that the certain MCS index is at least one of the MCS indices 28 to 31 corresponding to reserved bits, but the value of the certain MCS index is not limited thereto.

In this manner, even when a PTRS is included in only one of PUSCH initial transmission and re-transmission, the TBS can be made same between the transmissions by specifying the TBS by using a bit of a certain field included in downlink control information (for example, UL grant) that indicates re-transmission.

(Variation)

It has been discussed to perform a random access procedure by using steps less than four steps of an existing random access procedure in NR. An example is a random access procedure using two steps. The random access procedure using two steps is also called two-step random access procedure, two-step RACH, or 2-step RACH. The above-described first to fifth aspects may be applied in the two-step RACH.

Figure 8:
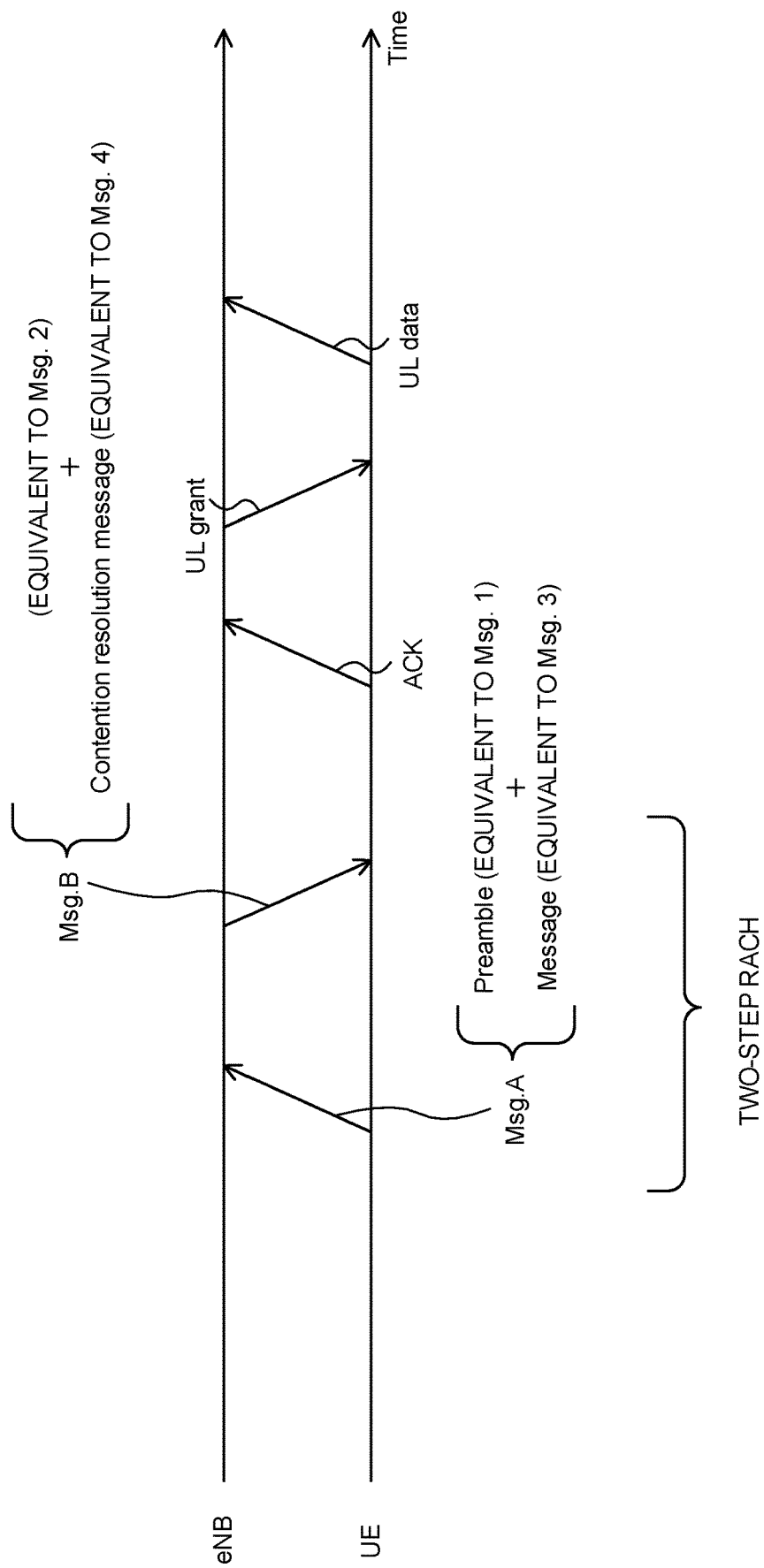
FIG. 8 is a diagram to show an example of a two-step random access procedure.

An example of the two-step RACH is shown in FIG. 8. The two-step RACH may include a first step of performing transmission from the UE to the base station, and a second step of performing transmission from the base station to the UE.

For example, in the first step, at least one of a UL signal and a UL channel (hereinafter also referred to as UL signal/UL channel) in which a preamble and a message are included may be transmitted the UE to the base station. The preamble may have a function similar to that of Message 1 (PRACH) in the existing random access procedure. The message may have a function similar to that of Message 3 (PUSCH) in the existing random access procedure. Note that the preamble and the message transmitted in the first step may be referred to as Message A (Msg. A) or a first message.

In the second step, at least one of a DL signal and a DL channel (hereinafter also referred to as DL signal/DL channel) in which a response and a contention-resolution are included may be transmitted from the base station to the UE. The response may have a function similar to that of Message 2 (random access response (RAR) transmitted in a PDSCH) in the existing random access procedure. The contention-resolution may have a function similar to that of Message 4 (PDSCH) in the existing random access procedure. Note that the messages transmitted in the second step may be referred to as Message B (Msg. B) or a second message.

Figure 9:
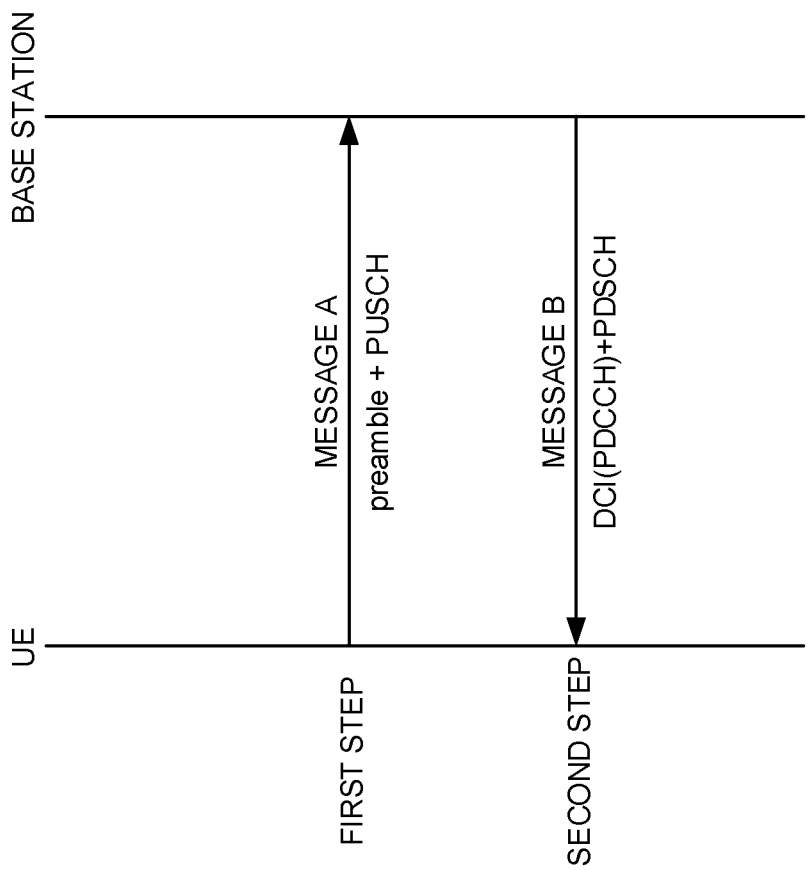
FIG. 9 is a diagram to show another example of the two-step random access procedure.

It is assumed that, in the two-step RACH, for example, transmission of the message (equivalent to the existing Message 3) in the first step is performed by using an uplink shared channel (for example, PUSCH) (refer to FIG. 9). In such a case, at least one of the above-described first to fifth aspects may be applied to initial transmission and re-transmission of a PUSCH included in Message A.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
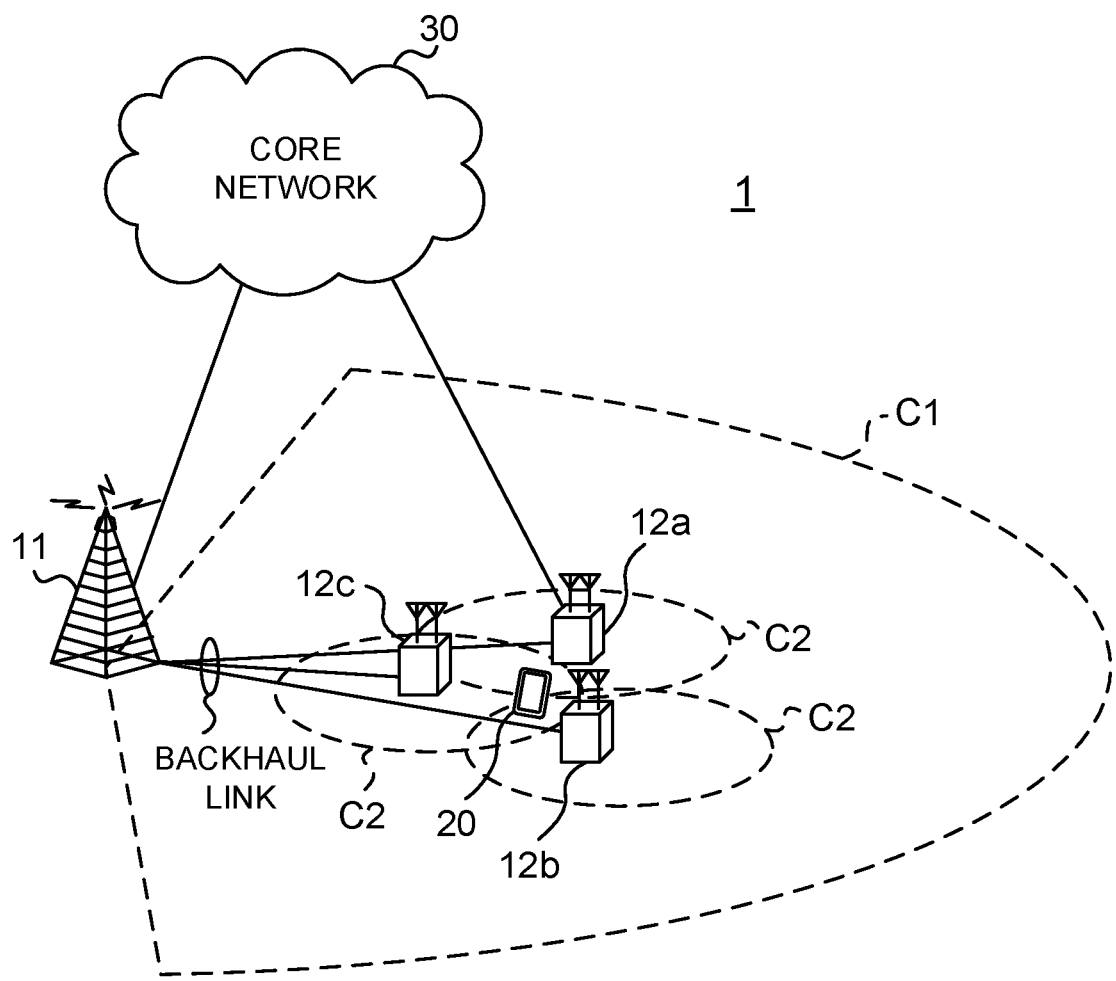
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
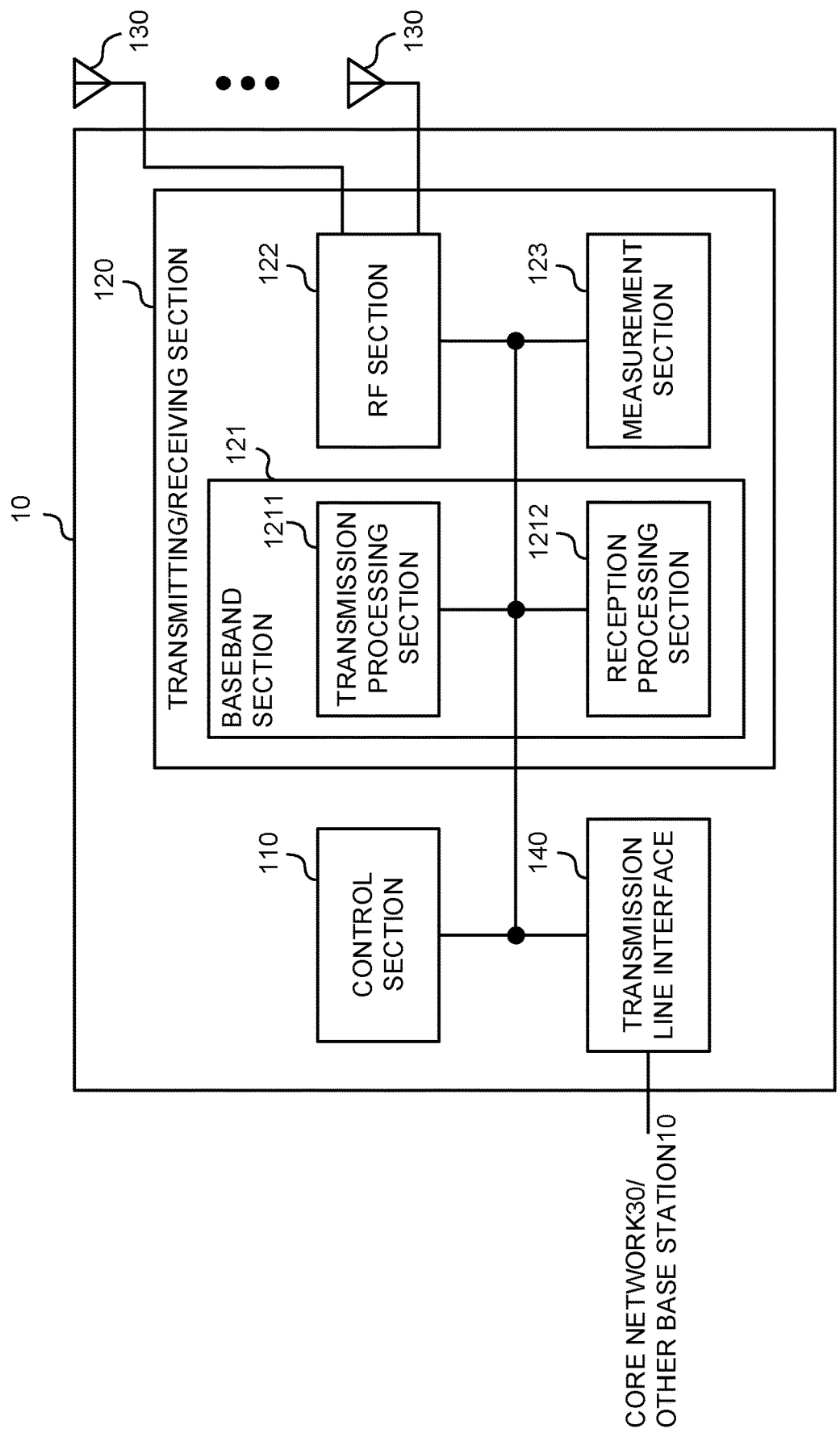
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may receive an uplink shared channel. The transmitting/receiving section 120 may transmit control information (for example, PDCCH-order) that indicates transmission of a random access preamble. The transmitting/receiving section 120 may transmit a response signal corresponding to the random access preamble. The transmitting/receiving section 120 may transmit information related to PTRS configuration (for example, higher layer signaling).

When receiving an uplink shared channel, the control section 110 may determine the existence of a phase tracking reference signal (PTRS) based on the type of an RNTI (Radio Network Temporary Identifier) used for downlink control information that schedules the uplink shared channel. When receiving an uplink shared channel, the control section 110 may determine the existence of a phase tracking reference signal (PTRS) based on the type of an RNTI (Radio Network Temporary Identifier) used for the uplink shared channel.

The control section 110 may control reception based on an assumption that the existence of transmission of a phase tracking reference signal (PTRS) in initial transmission and the existence of transmission of a PTRS in re-transmission are commonly configured. Alternatively, the control section 110 may control reception based on an assumption that the existence of transmission of a phase tracking reference signal (PTRS) in initial transmission and the existence of transmission of a PTRS in re-transmission are independently (for example, differently) configured.

The control section 110 may specify downlink control information so that the same transport block size is applied to PUSCH initial transmission and re-transmission.

(User Terminal)

Figure 12:
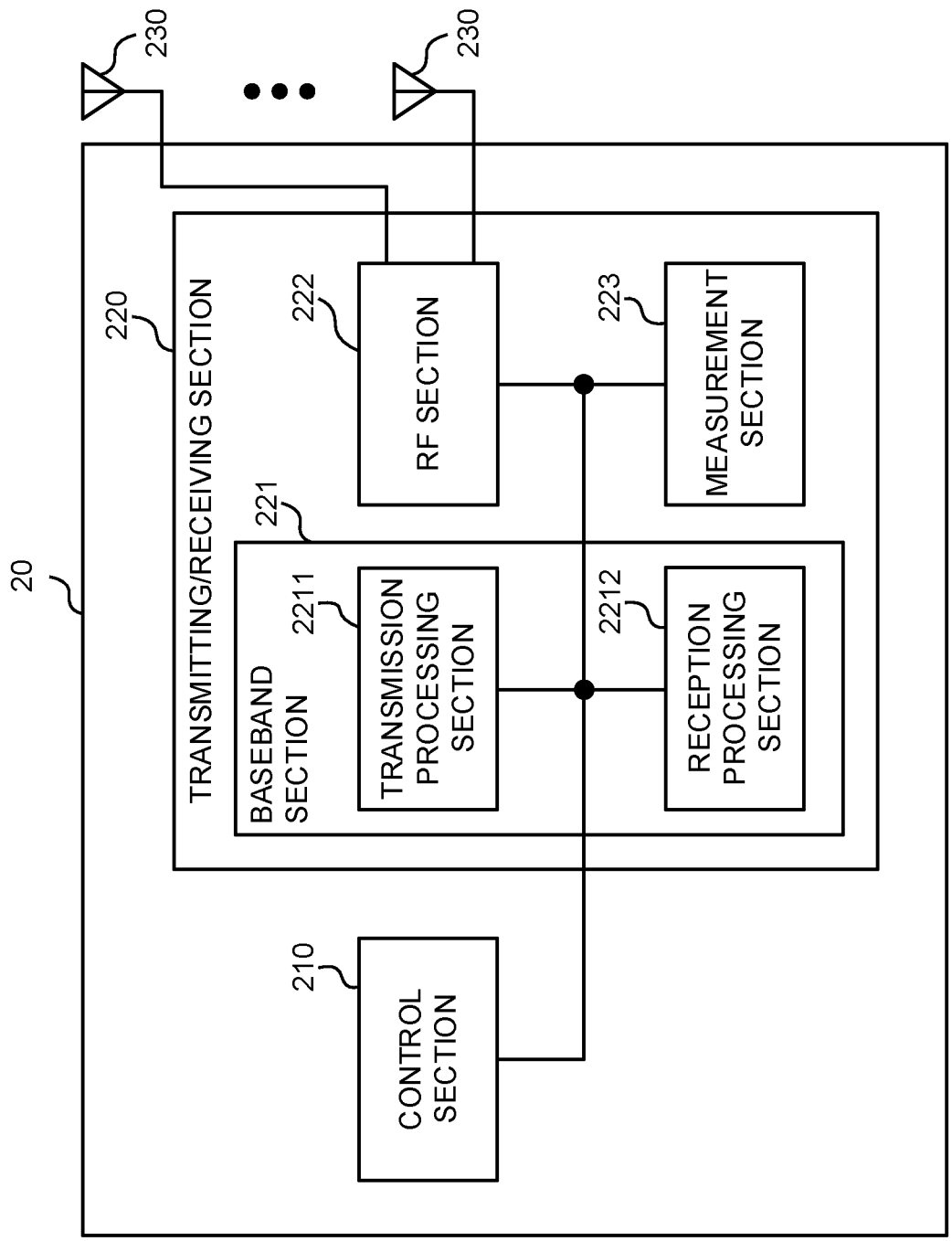
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may transmit an uplink shared channel. The transmitting/receiving section 220 may receive control information (for example, PDCCH-order) that indicates transmission of a random access preamble. The transmitting/receiving section 120 may transmit the random access preamble. The transmitting/receiving section 120 may receive a response signal corresponding to the random access preamble. The transmitting/receiving section 120 may receive information related to PTRS configuration (for example, higher layer signaling).

When transmitting an uplink shared channel, the control section 210 may determine the existence of transmission of a phase tracking reference signal (PTRS) based on the type of an RNTI (Radio Network Temporary Identifier) used for downlink control information that schedules the uplink shared channel. Alternatively, when transmitting an uplink shared channel, the control section 210 may determine the existence of transmission of a phase tracking reference signal (PTRS) based on the type of an RNTI (Radio Network Temporary Identifier) used for the uplink shared channel. The control section 210 may execute control not to perform PTRS transmission when transmitting an uplink shared channel based on a UL transmission indication included in a response signal corresponding to a random access preamble.

When transmitting an uplink shared channel based on a response signal, the control section 210 may execute control so that the existence of transmission of a phase tracking reference signal (PTRS) in initial transmission and the existence of transmission of a PTRS in re-transmission are in common. Even when having received information related to PTRS configuration, the control section 210 may control the existence of transmission of a PTRS in each of initial transmission and re-transmission irrespective of the information.

Alternatively, when transmitting an uplink shared channel based on a response signal, the control section 210 may separately control the existence of transmission of a phase tracking reference signal (PTRS) in initial transmission and the existence of transmission of a PTRS in re-transmission. Even when having received information related to PTRS configuration, the control section 210 may execute control to perform PTRS transmission in one of initial transmission and re-transmission irrespective of the information but not to perform PTRS transmission in the other.

The control section 210 may perform re-transmission by applying a transport block size same as that in initial transmission when an index of a modulation and coding scheme, which is included in downlink control information that schedules re-transmission of an uplink shared channel is a certain value.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
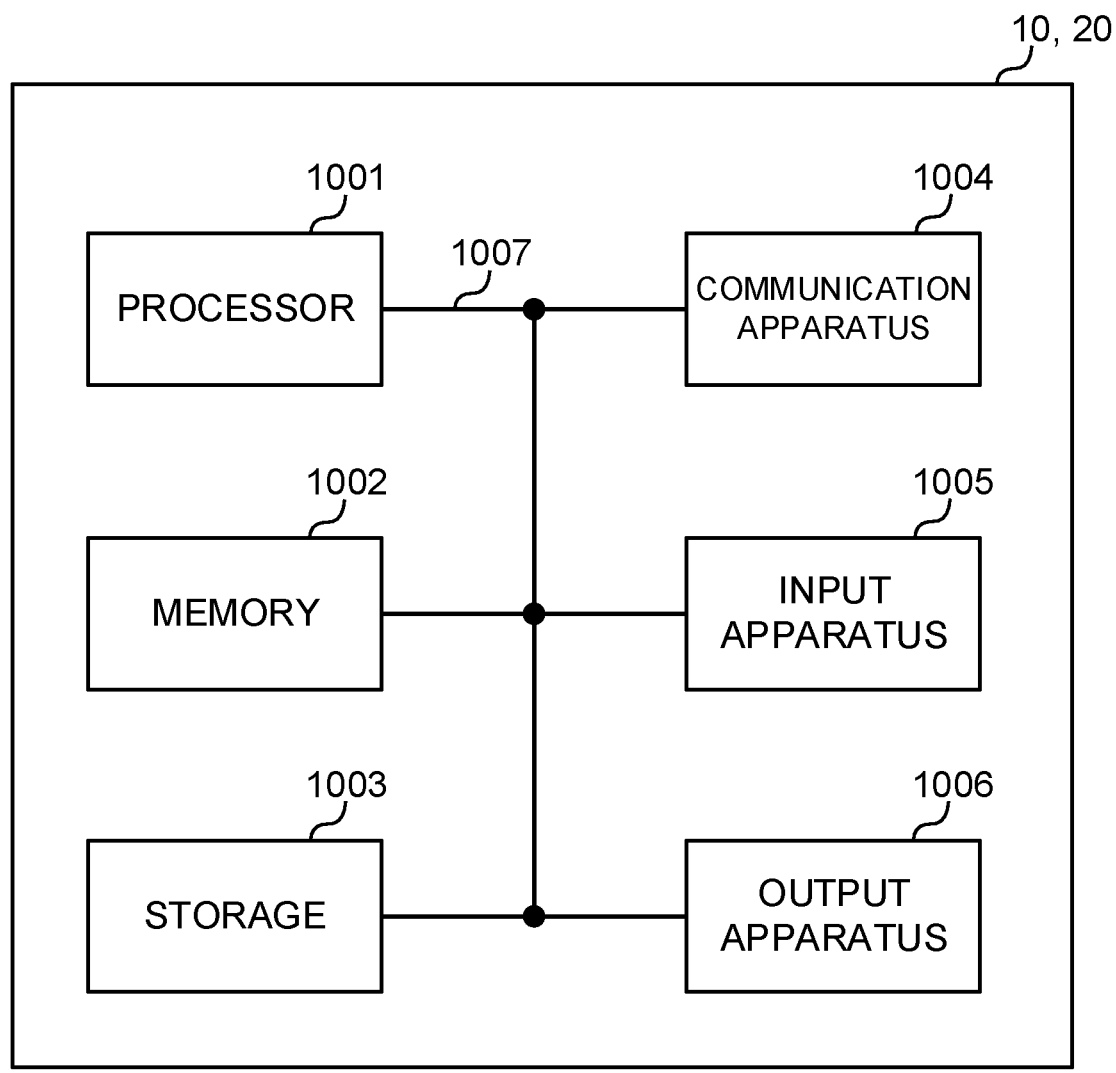
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/ channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit,"

"remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a transmitter that transmits an uplink shared channel; and
    a processor that, when the uplink shared channel is scheduled by a downlink control channel and the downlink control channel is cyclic redundancy check (CRC)-scrambled by a given radio network temporary identifier (RNTI), controls a transmission of a phase tracking reference signal (PTRS) in a transmission of the uplink shared channel,
    wherein when a transmission of an uplink shared channel is performed based on a UL transmission indication included in a response signal corresponding to a random access preamble, the processor controls to not perform a transmission of a PTRS in the transmission of the uplink shared channel,
    when a retransmission of the uplink shared channel which has been transmitted based on the UL transmission indication included in the response signal is performed, the processor controls to not perform a transmission of a PTRS in the retransmission of the uplink shared channel, and
    the processor controls to not perform, in contention-free random access, a transmission of a PTRS in a transmission of an uplink shared channel scheduled by a UL grant included in a response signal corresponding to a random access preamble.

2. The terminal according to claim 1, wherein when a transmission of a configured-grant-based uplink shared channel is performed, the processor controls to perform a transmission of a PTRS.

3. The terminal according to claim 1, wherein when the uplink shared channel is scheduled by a downlink control channel and the downlink control channel is CRC-scrambled by an RNTI other than the given RNTI, the processor determines that a transmission of a PTRS does not exist in the transmission of the uplink shared channel.

4. A radio communication method for a terminal, comprising:
    transmitting an uplink shared channel;
    when the uplink shared channel is scheduled by a downlink control channel and the downlink control channel is cyclic redundancy check (CRC)-scrambled by a given radio network temporary identifier (RNTI), controlling a transmission of a phase tracking reference signal (PTRS) in a transmission of the uplink shared channel;
    controlling, when a transmission of an uplink shared channel is performed based on a UL transmission indication included in a response signal corresponding to a random access preamble, to not perform a transmission of a PTRS in the transmission of the uplink shared channel,
    controlling, when a retransmission of the uplink shared channel which has been transmitted based on the UL transmission indication included in the response signal is performed, to not perform a transmission of a PTRS in the retransmission of the uplink shared channel; and
    controlling to not perform, in contention-free random access, a transmission of a PTRS in a transmission of an uplink shared channel scheduled by a UL grant included in a response signal corresponding to a random access preamble.

5. A base station comprising:
    a transmitter that transmits a downlink control channel which is cyclic redundancy check (CRC)-scrambled by a given radio network temporary identifier (RNTI); and
    a receiver that receives an uplink shared channel and a phase tracking reference signal (PTRS) corresponding to the uplink shared channel,
    wherein the uplink shared channel is scheduled by the downlink control channel,
    wherein when a transmission of an uplink shared channel is performed based on a UL transmission indication included in a response signal corresponding to a random access preamble, a terminal controls to not perform a transmission of a PTRS in the transmission of the uplink shared channel,
    when a retransmission of the uplink shared channel which has been transmitted based on the UL transmission indication included in the response signal is performed, the terminal controls to not perform a transmission of a PTRS in the retransmission of the uplink shared channel, and
    the terminal controls to not perform, in contention-free random access, a transmission of a PTRS in a transmission of an uplink shared channel scheduled by a UL grant included in a response signal corresponding to a random access preamble.

6. A system comprising a terminal and a base station, wherein the terminal comprises:
    a transmitter that transmits an uplink shared channel; and
    a processor that, when the uplink shared channel is scheduled by a downlink control channel and the downlink control channel is cyclic redundancy check (CRC)-scrambled by a given radio network temporary identifier (RNTI), controls a transmission of a phase tracking reference signal (PTRS) in a transmission of the uplink shared channel,
    wherein when a transmission of an uplink shared channel is performed based on a UL transmission indication included in a response signal corresponding to a random access preamble, the processor controls to not perform a transmission of a PTRS in the transmission of the uplink shared channel,
    when a retransmission of the uplink shared channel which has been transmitted based on the UL transmission indication included in the response signal is performed, the processor controls to not perform a transmission of a PTRS in the retransmission of the uplink shared channel, and the processor controls to not perform, in contention-free random access, a transmission of a PTRS in a transmission of an uplink shared channel scheduled by a UL grant included in a response signal corresponding to a random access preamble, and the base station comprises:
a transmitter that transmits the downlink control channel which is CRC-scrambled by the given RNTI; and
a receiver that receives the uplink shared channel and the PTRS.

* * * * *